United States Patent Office 2,863,904
Patented Dec. 9, 1958

2,863,904

AMINE SALTS OF DI OXO-OCTYL ORTHOPHOSPHATES

Troy L. Cantrell, Drexel Hill, Pa., and John G. Peters, Audubon, N. J., assignors to Gulf Oil Corporation, Pittsburgh, Pa., a corporation of Pennsylvania No Drawing. Application May 9, 1955
Serial No. 507,128

3 Claims. (Cl. 260—461)

This invention relates to a novel class of amine salts of di oxo-octyl orthophosphates. More particularly, the invention relates to the class of substantially neutral salts of $C_{8-18}$ primary n-alkyl amines and di oxo-octyl acid orthophosphates, and to the use of these salts in mineral oils.

In order to protect metal surfaces contacted by mineral oil compositions from rust or corrosion, it is desirable that such compositions have incorporated therein a material having rust and corrosion inhibiting properties. In order that the rust inhibiting potency of the oils may not be diminished during storage, transporting, or use, it is important that the inhibitor employed in the oil should not be susceptible to water leaching. In this connection, it is noted that mineral oils of the fuel and lubricant type may be exposed to contact with water in bulk storage tanks, in tanks of marine vessels, or during usage in the presence of water, steam, or atmospheric moisture.

We have found that substantially neutral salts of primary n-alkyl amines containing 8 to 18 carbon atoms per molecule and di oxo-octyl acid orthophosphate impart excellent rust and corrosion inhibiting characteristics to various mineral oil compositions, and at the same time they are extraordinarily resistant to water leaching. The present invention includes compounds of the foregoing class.

The compounds of this invention can be prepared in any suitable manner. According to a preferred procedure, a di oxo-octyl acid orthophosphate is substantially neutralized by addition thereto of an approximately equimolar amount of a primary n-alkyl amine of the class disclosed herein. The reaction proceeds spontaneously at room temperature with evolution of heat. The temperature of the reaction should be maintained below about 200° F. and preferably below about 180° F., in order to prevent water from splitting out of the addition salt reaction product. Control of the reaction temperature may be achieved, for example, by controlling the rate of addition of n-alkyl amine, or by external cooling, or both. The overall time required to complete the reaction will vary somewhat according to the method by which the temperature is controlled and according to the temperature at which the reaction is carried out. Normally, it will be desirable to continue to stir the reaction mixture after amine addition is complete for about the same length of time as required to add the amine, in order to insure completion of the reaction. Toward the end of the addition of the amine, it may be found convenient to measure the pH in order to insure that the reaction product will be substantially neutral, i. e., that it will have a pH of about 5.5 to about 7.5, and preferably about 7.

The di oxo-octyl ester of orthophosphoric acid used in making the amine salts of this invention also may be prepared in any suitable manner. For example, a preferred method involves addition of $P_2O_5$ to the oxo-octyl alcohol in a mol ratio of about 1:4, again maintaining the reaction temperature below about 180° F. by controlling the rate of addition of $P_2O_5$, or by external cooling, or by both. After addition of $P_2O_5$ is complete, the reaction mixture should be stirred until the product is clear. Some external heating, below about 180° F., may be desirable toward the end of the reaction in order to accelerate completion.

Amines that form suitable addition salts with the disclosed di oxo-octyl phosphates are primary n-alkyl amines containing 8 to 18 carbon atoms per molecule. An example of a preferred primary n-alkyl amine that forms suitable salts with the di oxo-octyl acid orthophosphate is n-dodecyl (lauryl) amine. It is not necessary that the amine be in pure form, and other amines can be present. In fact, excellent results have been obtained with addition salts prepared from mixtures of primary n-alkyl amines of the class disclosed. An example of a commercial mixture of amines that forms outstandingly effective addition salts with di oxo-octyl acid orthophosphate is cocoamine, which is a mixture of primary n-alkyl amines derived from coconut oil fatty acids. Cocoamine normally has a mol combining weight of about 210, a melting point of about 21° C., and is composed principally of n-dodecyl amine, together with lesser amounts of homologous, primary straight chain amines containing an even number of carbon atoms ranging from 8 to 18.

Examples of other amines within the disclosed class are n-octyl amine (caprylyl amine), n-decyl amine (capryl amine), n-tetradecyl amine (myristyl amine), and n-hexadecyl amine (palmityl amine).

Dioctyl acid orthophosphates that are suitable for the purposes of this invention are those derived from socalled "oxo-" octyl alcohols, which, as is known, are highly branched chain saturated aliphatic monohydric octyl alcohols prepared by the "Oxo" process. Briefly, this process involves the hydroformylation of olefinic hydrocarbons, followed by hydrogenation of the carbonylic compounds thus obtained. Normally, the olefinic hydrocarbons used in the manufacture of oxo-octyl alcohols are prepared by condensation of $C_3$ and $C_4$ olefins in the usual proportion in which they occur in refinery process gases. In this case, oxo-octyl alcohols normally will contain a mixture of branched chain isomers of octyl alcohol, and the mixture will consist mostly of isomeric dimethylhexanols. Although the above-indicated composition is the most common for oxo-octyl alcohols, it will be appreciated that the nature and proportions of the isomeric mixed alcohols can be varied to some extent by varying the proportions of the $C_3$ and $C_4$ olefins used in preparing the $C_7$ olefin to be hydroformylated.

Although dialkyl acid orthophosphates prepared from any oxo-octyl alcohols can be used to form the n-alkyl amine salts of this invention, we prefer to use those prepared by hydroformylation and hydrogenation of a mixed $C_7$ olefin that is obtained by condensing $C_3$ and $C_4$ olefins in the proportion that they normally occur in petroleum refinery gases; that is, in the proportion that they occur in the refining, e. g., catalytic cracking, and the like, of heavier petroleum hydrocarbons. This preference is based principally on cost considerations.

A specific example of an especially effective agent for the purposes of the invention is the neutral addition salt (pH 7) of cocoamine and di oxo-octyl acid orthophosphate. Other salts included by the invention are the substantially neutral n-octyl amine, n-decyl amine, n-tetradecyl amine, and n-hexadecyl amine salts of di oxo-octyl acid orthophosphate.

The preparation and character of the salts of this invention can be further illustrated by the following specific example:

EXAMPLE I

To 2600 g. of oxo-octyl alcohol, which had been previously placed in a stainless steel vessel set in a water bath, were slowly added 710 g. of phosphorus pentoxide, with stirring, the temperature of the reaction being maintained at 180° F. or below. Stirring of the reaction mixture was continued until the product became clear. The reaction was considered complete after about 30–60 minutes.

The oxo-octyl alcohol used in the reaction was obtained by the hydrogenation of a hydroformylated mixture of heptene isomers. The oxo-octyl alcohols had the structure

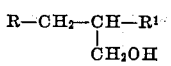

and

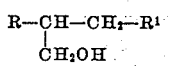

where R and $R^1$ are hydrogen or alkyl. The alcohols had the following inspections:

Specific gravity, 20°/20° C. _____ 0.8324
Viscosity, kinematic, cs., 20° C. _____ 12.43
Refractive index, $n^{20}/D$ _____ 1.4313
$C_8$ alcohol content, percent by wt. _____ 99.3
$C_8$ carbonyl content, percent by wt. _____ 0.06
Distillation, isooctyl alcohol,
  ASTM D1078–49 T, ° C.:
    Over point _____ 184.0
    Dry point _____ 188.5
    10% _____ 185.5
    50% _____ 186.4
    90% _____ 187.5

The product of the foregoing reaction was di oxo-octyl acid orthophosphate. To 300 g. of this product there were added 223 g. of cocoamine (Armeen CD, Armour & Co.), with stirring, the temperature of the reaction being maintained below about 180° F. The addition of the amine was complete in about 10–15 minutes and stirring of the mixture was continued for about an equal length of time thereafter. The product of this reaction was the cocoamine salt (principally n-dodecyl amine salt) of di oxo-octyl acid orthophosphate. This product had the following inspections:

Gravity, °API _____ 21.2
Viscosity, SUV, sec., 210° F. _____ 403
Color, NPA _____ 1.25
Appearance _____ Bright
Physical state, room temp. _____ Liquid
Phosphorus, percent _____ 5.62
pH value (glass calomel electrodes) _____ 7.2

The salts of this invention can be incorporated in various mineral compositions in amounts sufficient to impart corrosion inhibiting properties to the composition. For example, the salts of this invention are useful when employed in oils in amounts of about 0.001 to about 1.0 percent by weight. Excellent results have been obtained by the use in petroleum distillates such as gasoline, jet engine fuel and lubricating oil, of amounts of the salts between about 0.002 and about 0.1 percent by weight of the composition. It will be understood that the optimum amount will vary according to the particular mineral oil and according to the conditions to which the oil is subjected.

Mineral oil compositions containing the salts of this invention are illustrated by the following examples:

EXAMPLE II

A composition according to this invention was prepared by dissolving 0.0126 per cent by weight of the salt of Example I in a highly paraffinic turbine lubricating oil base that had not been previously inhibited against rust. This oil composition was tested according to the standard accelerated corrosion test, ASTM D665–53T, Procedure A (distilled water). After 24 hours, the standard steel test rod was bright and free from rust. In contrast, the uninhibited base oil will produce 100% rusting under the same test conditions.

EXAMPLE III

Other compositions were prepared by incorporation of a neutral salt of cocoamine and di oxo-octyl o-phosphate, prepared substantially identically as in Example I, in amounts of 5 and 20 pounds per thousand barrels of fuel, into separate samples of a military grade JP–4 jet engine fuel that was otherwise uninhibited against rusting, and that had been previously depolarized with activated alumina. These compositions were tested by subjecting them to a modification (MIL–I–25017(ASG) Method 4011–B of ATSM D665–53T, Procedure B (salt water), wherein the composition is first subjected to water washing with 10% of distilled water, and then subjected to the ASTM test procedure, modified to 100° F. and 20 hours, for fuel. At the end of the 20 hour period, the test rods from both samples were free of rust. The uninhibited, depolarized base fuel will produce essentially complete rusting under the same circumstances.

EXAMPLE IV

Another composition was prepared by incorporating 16 ponds per thousand barrels of the salt of Example III in a commercial 80/87 grade aviation gasoline containing 0.5 ml. teraethyllead per gallon. This composition was tested according to a modified ASTM D665–53 T, wherein the gasoline, previously depolarized with 100 g./gal. of activated alumina, was subjected to Procedure A of the ASTM test, modified to 80° F. and 20 hours for fuel. At the end of the test period, the steel test rod showed no rust. The uninhibited gasoline will produce 100 percent rusting of the test rod under the same test conditions.

The foregoing examples demonstrate the effectiveness of the n-alkyl di oxo-octyl orthophosphates of this invention in a variety of mineral oil compositions. It will be appreciated that these examples are illustrative only and that other mineral oil compositions having corrosion inhibiting properties and falling within the scope of the invention can be prepared by substitution of other n-alkyl amine di oxo-octyl orthophosphates and mineral oils disclosed herein for those of the foregoing examples, in the same or equivalent proportions.

The extraordinary resistance to water leaching by the n-alkyl amine salts of the present invention has been demonstrated by repeated water washing of samples of depolarized isooctane containing equivalent amounts of various n-alkylamine dialkyl orthophosphates and determining the amount of the addition salt remaining in the isooctane layer. More particularly, separate samples of depolarized isooctane were made up, on an equivalent phosphorus basis, and containing, respectively, the neutral cocoamine salts of (a) diisoamyl acid orthophosphate, (b) 3-methylbutyl, 2-ethylhexyl acid orthophosphate, and (c) di oxo-octyl acid orthophosphate. Each sample was washed five times with 10 percent by volume of distilled water, and after each wash the water layer was analyzed to determine the amount of phosphorous therein. From this value the quantity of additive remaining in the isooctane layer was determined. The results of these tests are presented in the following table.

Table A

|  | 1 | 2 | 3 |
|---|---|---|---|
| Make-up, Percent by Vol.: | | | |
| Depolarized Isooctane | 100.0 | 100.0 | 100.0 |
| Additive Added— | | | |
| Cocoamine Diisoamyl Orthophosphate | 0.8 | | |
| Cocoamine 3-Methylbutyl, 2-Ethylhexyl Orthophosphate | | 1.0 | |
| Cocoamine Di oxo-octyl Orthophosphate | | | 0.9 |
| Inspection: | | | |
| Phosphorus, p. p. m | 496 | 503 | 506 |
| Successive Water Washes, 10% Dist. Water— | | | |
| After First Water Wash: | | | |
| Phosphorus in Wash Water, p. p. m | 162 | 51 | 19 |
| Additive in Isooctane, percent | 96.2 | 98.8 | 99.5 |
| After Second Water Wash: | | | |
| Phosphorus in Wash Water, p. p. m | 112 | 89 | 21 |
| Additive in Isooctane, percent | 93.5 | 96.6 | 99.2 |
| After Third Water Wash: | | | |
| Phosphorus in Wash Water, p. p. m | 82 | 89 | 20 |
| Additive in Isooctane, percent | 91.5 | 94.5 | 98.8 |
| After Fourth Water Wash: | | | |
| Phosphorus in Wash Water, p. p. m | 72 | 52 | 20 |
| Additive in Isooctane, percent | 89.7 | 93.2 | 98.3 |
| After Fifth Water Wash: | | | |
| Phosphorus in Wash Water, p. p. m | 43 | 43 | 17 |
| Additive in Isooctane, percent | 88.7 | 92.2 | 97.8 |

From the foregoing data it will be seen that the additive prepared from oxo-octyl alcohol was remarkably more resistant to water washing than the non-oxo-alcohol derived counterparts. This is quite surprising in view of the highly branched character of oxo-octyl alcohols.

It is noted that the difference in solubility cannot be accounted for on the basis of molecular weight alone. Thus, the normal plot of water solubility against the number of carbon atoms is a related series of compounds is a concave curve. Extrapolation of the curve produced by a plot of total water soluble material after 5 water washes against the number of carbon atoms in the alkyl groups of the phosphate radicals in the compounds of runs 1 and 2 in accordance with the normal shape of such curves, indicates that a substantially larger total number of alkyl carbon atoms would be required to achieve the low water solubility of the herein disclosed n-alkyl di oxo-octyl orthophosphates. Low water solubility with a low total number of carbon atoms in the alkyl groups of the phosphate radical is important in order not to sacrifice rust and corrosion inhibiting potency.

In addition to the mineral oils disclosed above, the salts of this invention will produce good results when incorporated in other gasolines, lubricating oils, kerosene, diesel fuels, furnaces oils, grease compositions, synthetic lubricants, and the like. In addition to the properties previously indicated herein, the compounds of this invention are considered to possess pre-ignition control characteristics, anti-stalling, combustion improving, and tetraethyllead stabilizing properties.

In addition to the agents disclosed herein, the mineral oil compositions containing the same can have added thereto one or more additional agents designed to improve one or more properties of the composition. Thus, there can be added other anti-rust agents, de-icing agents, detergents, dispersants, anti-knock agents, lead scavengers, sludge inhibitors, pour point depressants, ignition control agents, anti-oxidants, thickeners, viscosity index improvers, and the like.

Many modifications of the above described subject matter can be resorted to without departing from the spirit or scope of the invention. Accordingly, only such limitations should be imposed thereon as are found in the appended claims.

We claim:

1. A substantially neutral salt of a primary n-alkyl amine containing 8 to 18 carbon atoms per molecule and di oxo-octyl acid orthophosphate.

2. A substantially neutral salt of n-dodecyl amine and di oxo-octyl acid orthophosphate.

3. The substantially neutral salt of cocoamine and di oxooctyl acid orthophosphate.

References Cited in the file of this patent

UNITED STATES PATENTS

| 2,387,537 | Smith et al. | Oct. 23, 1945 |
| 2,441,295 | Smith et al. | May 11, 1948 |
| 2,447,288 | Smith et al. | Aug. 17, 1948 |
| 2,602,049 | Smith et al. | July 1, 1952 |
| 2,656,372 | Ernst et al. | Oct. 20, 1953 |
| 2,664,400 | Woodstock et al. | Dec. 29, 1953 |